(12) United States Patent
Martinelli et al.

(10) Patent No.: US 8,731,403 B2
(45) Date of Patent: May 20, 2014

(54) MULTICAST OPTICAL SWITCH

(75) Inventors: Massimo Martinelli, Santa Clara, CA (US); Manish Sharma, Morgan Hill, CA (US); Ruipeng Sun, Pleasanton, CA (US); Mark H. Garrett, Morgan Hill, CA (US); Aravanan Gurusami, Morgan Hill, CA (US)

(73) Assignee: II-VI Incorporated, Saxonburg, PA (US)

(*) Notice: Subject to any disclaimer, the term of this patent is extended or adjusted under 35 U.S.C. 154(b) by 163 days.

(21) Appl. No.: 13/368,254

(22) Filed: Feb. 7, 2012

(65) Prior Publication Data

US 2013/0202297 A1 Aug. 8, 2013

(51) Int. Cl.
*H04J 14/00* (2006.01)
*H04J 14/02* (2006.01)

(52) U.S. Cl.
USPC ............... 398/49; 398/86; 398/87; 398/88

(58) Field of Classification Search
USPC .......... 398/45, 48–50, 55–57, 164, 86, 87, 88
See application file for complete search history.

(56) References Cited

U.S. PATENT DOCUMENTS

| | | | |
|---|---|---|---|
| 5,786,915 A | 7/1998 | Scobey | |
| 5,859,717 A | 1/1999 | Scobey et al. | |
| 6,198,857 B1 | 3/2001 | Grasis et al. | |
| 7,209,657 B1 * | 4/2007 | Islam | 398/45 |
| 7,298,972 B2 * | 11/2007 | Okada et al. | 398/33 |
| 7,450,801 B2 | 11/2008 | Doerr et al. | |
| 7,873,246 B2 * | 1/2011 | Nagy et al. | 385/18 |
| 8,218,967 B1 * | 7/2012 | Stevens | 398/55 |
| 8,280,257 B2 * | 10/2012 | Yang et al. | 398/83 |
| 8,437,634 B2 * | 5/2013 | Sakurai | 398/45 |
| 2004/0146298 A1 * | 7/2004 | Ikegame | 398/45 |
| 2007/0160321 A1 * | 7/2007 | Wu et al. | 385/24 |
| 2008/0031627 A1 * | 2/2008 | Smith et al. | 398/83 |
| 2008/0212157 A1 * | 9/2008 | Ishii et al. | 359/223 |
| 2013/0209031 A1 * | 8/2013 | McLaughlin et al. | 385/17 |

OTHER PUBLICATIONS

Shirasaki et al., "Virtually Imaged Phased Array with Graded Reflectivity," *IEEE Photonics Technology Letters* 11(11):1443-1445 (Nov. 1999).
Sharma, M., et al., "Next-Generation ROADM Technologies and Architecture," Proceedings of SPIE—The International Society for Optical Engineering, vol. 8283, Paper 828309-2, 9 Pages, 2012.

* cited by examiner

*Primary Examiner* — Dalzid Singh
(74) *Attorney, Agent, or Firm* — Fenwick & West LLP

(57) ABSTRACT

A multicast optical switch includes a free-space optical assembly of discrete splitters, cylindrical optics, and a linear array of reflective switching devices, such as microelectromechanical systems (MEMS) mirrors, to provide low-loss, high-performance multicast switching in a compact configuration. The assembly of optical splitters may include multiple planar lightwave circuit splitters or a multi-reflection beam splitter that includes a linear array of partially reflecting mirrors, each of a different reflectivity.

23 Claims, 12 Drawing Sheets

MULTICAST OPTICAL SWITCH

BACKGROUND

1. Field of the Invention

Embodiments of the present invention relate generally to optical communication systems and components and, more particularly, to a multicast optical switch.

2. Description of the Related Art

Optical switches are widely deployed in optical communication networks to provide functions such as optical signal routing, protection switching, and system performance monitoring. In particular, multicast optical switches, which are capable of delivering a copy of a single optical signal to multiple destinations simultaneously, have been identified as a key component for multiplexing and routing different optical signals into or out of a single optical fiber. This capability is especially useful for Colorless Contentionless and Directionless Reconfigurable Optical Add-Drop Multiplexers (ROADMs) used in wavelength-division multiplexing (WDM) systems. For a full description of how multicast switches enable next-gen CDC-ROADMs see, for example, "Next-generation ROADM technologies and architecture", Paper 8283-8, SPIE Photonics West 2012 Conference 8283.

Multicast optical switches using planar lightwave circuit (PLC) switches and splitters are known in the art, but suffer from various drawbacks. When such multicast switches are configured with discrete PLC splitters and switches, these optical components are typically interconnected by fiber pigtails, resulting in high cost and unwanted manufacturing complexity due to the larger number of fiber interconnections required. For example, to assemble an 8×16 multicast switch constructed from a plurality of individual PLC splitters requires sixteen 8×1 PLC splitters, eight 16×1 PLC splitters, and 128 fiber pigtail connections spliced therebetween. Alternatively, the various splitters and switches of a multicast optical switch can be integrated into a single monolithic PLC, but such configurations are generally high cost, difficult to fabricate, and suffer from low manufacturing yield.

SUMMARY

One or more embodiments of the present invention provide a multicast optical switch that has a compact, low loss design and is more easily manufacturable than prior art designs. A multicast optical switch according to one embodiment includes a free-space optical assembly of discrete splitters, cylindrical optics, and a linear array of reflective switching devices, such as microelectromechanical systems (MEMS) mirrors, to provide low-loss, high-performance multicast switching in a compact configuration.

An M×N multicast switch, according to an embodiment of the invention, includes M input ports, where M is greater than 1, N output ports, where N is greater than 1, M splitters, each configured to produce N split optical signals from an input optical signal received through one of the M input ports, and a 1×N array of mirrors each controllable to direct one of N split optical signals to one of the N output ports.

An M×N multicast switch, according to another embodiment of the invention, includes M input ports, where M is greater than 1, N output ports, where N is greater than 1, and M mirrors, each mirror associated with one of the input ports and controllable to direct an input optical signal from an associated input port to any one of the N output ports. In this switch, while one of the mirrors is controlled to switch the input optical signal directed at a first output port to be directed at a second output port, the input optical signal is optically decoupled from all of the output ports. As a result, hitless switching can be achieved using this switch.

An M×N multicast switch, according to still another embodiment of the invention, includes M input ports, where M is greater than 1, N output ports, where N is greater than 1, and a liquid-crystal on silicon (LCOS) panel having 1×N beam steering elements, each beam steering element comprising multiple pixels whose phase can be controlled individually to direct an input optical signal from any one of the M input ports to one of the N output ports associated with the beam steering element.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
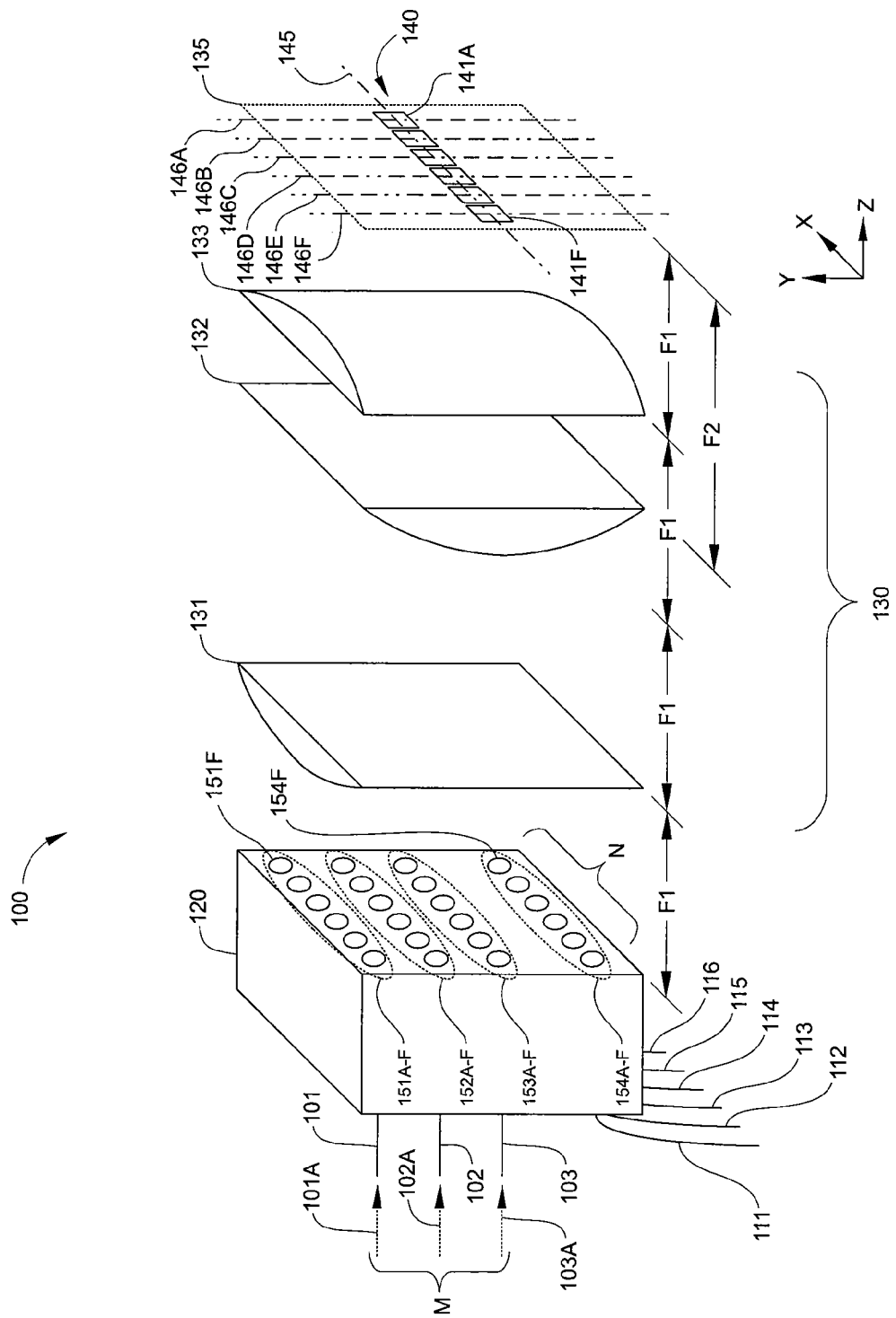
FIG. 1 is a schematic illustration of an M×N multicast optical switch, according to an embodiment of the invention.

FIG. 1 is a schematic illustration of an M×N multicast optical switch 100, according to an embodiment of the invention. Multicast optical switch 100 is an optical switch with an M×N switching capability, and therefore has the ability to switch any one of M input optical signals 101A-103A received at input ports 101-103 to any of N output ports 111-116. In addition, multicast optical switch 100 can multicast each of the M input optical signals to any number of the N output ports 111-116. For example, a copy of input optical signal 101A can be directed to each of output ports 111-116, or to any combination of output ports 111-116, or to none of output ports 111-116. For clarity, in FIG. 1, output ports 111-116 are depicted as output fibers extending below splitter array 120, but may also be any other technically feasible waveguide or optical coupling known in the art. Similarly, the M input ports 101-103 are depicted in FIG. 1 as input fibers extending from a rear surface of splitter array 120, but in some embodiments, input ports 101-103 may be any other technically feasible waveguide or optical coupling element known in the art. For ease of description, in the embodiment illustrated in FIG. 1, M=3 and N=8. In practice, M and N may have much higher values, such as 16, 24, or higher.

Multicast optical switch 100 includes a splitter array 120, free-space optics 130, and a linear array 140 of reflective switching devices, arranged as shown. In FIG. 1, the z-axis is parallel with the general direction of light propagation through multicast optical switch 100, the x-axis is the axis along which each of input optical signals 101A-103A are multicast, and the y-axis is the axis along which selection of input optical signals 101A-103A is performed. In FIG. 1, the x-axis is depicted as a horizontal axis and the y-axis is depicted as a vertical axis, however, one of skill in the art will appreciate that the x-, y-, and z-axes may be defined with different orientations relative to the general direction of light propagation through multicast optical switch 100 without exceeding the scope of the invention.

Figure 2:
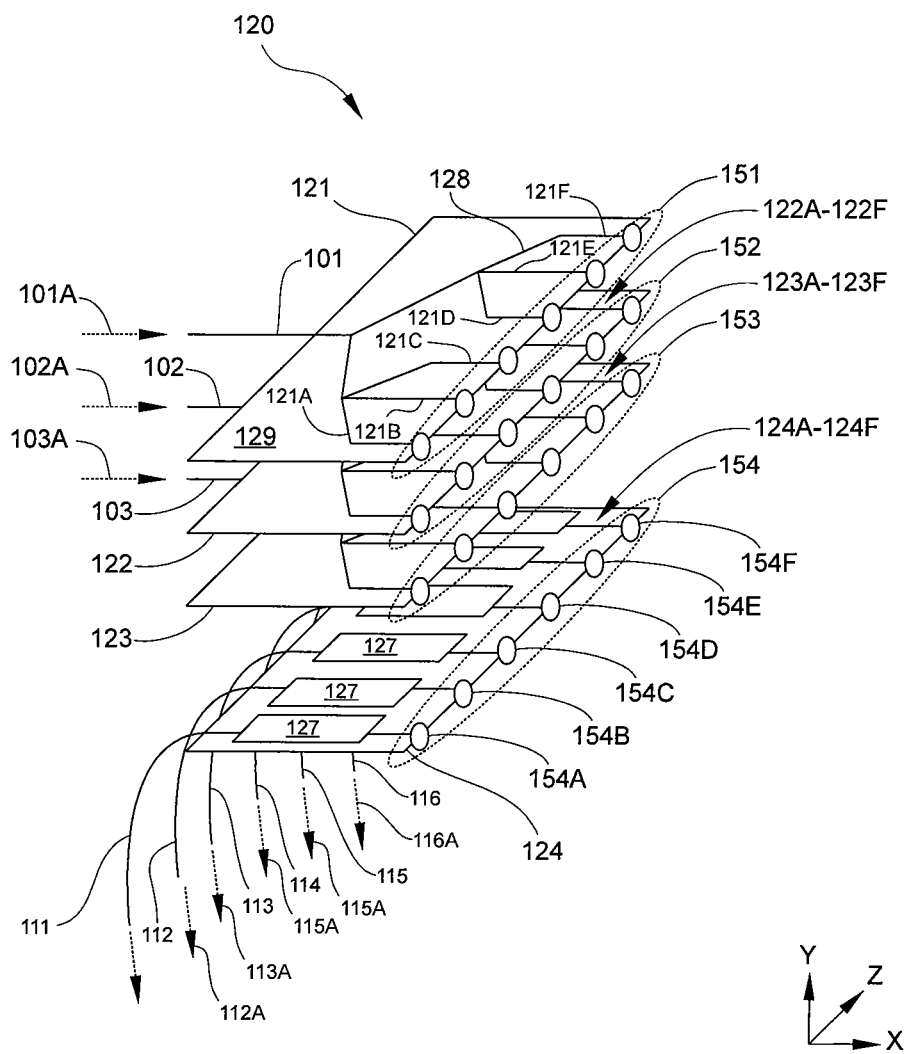
FIG. 2 illustrates a schematic exploded view of one embodiment of a splitter array.

Splitter array 120 includes multiple planar lightwave circuit (PLC) splitters 121-123 (illustrated in FIG. 2), each configured to split one of input optical signals 101A-103A into N copies. FIG. 2 illustrates a schematic exploded view of one embodiment of splitter array 120, according to an embodiment of the invention. Each of PLC splitters 121-123 includes planar silica waveguides 128 formed on a substrate 129 to form a fully passive optical branching device that produces uniform signal splitting. Thus, PLC splitter 121 receives input optical signal 101A at input port 101 and replicates input optical signal 101A at waveguides 121A-121F. Similarly, PLC splitter 122 receives input optical signal 102A at input port 102 and replicates input optical signal 102A at waveguides 122A-122F, and PLC splitter 123 receives input optical signal 103A at input port 103 and replicates input optical signal 103A at waveguides 123A-123F. It is noted that because each of PLC splitters 121-123 uniformly splits a received input optical signal into N replicated signals, the optical power of each replicated signal is one Nth that of the original input optical signal. In some embodiments, PLC splitters 121-123 are stacked and packaged together in a small form factor housing for ease of assembly and alignment with free-space optics 130 and other components of multicast optical switch 100.

In some embodiments, splitter array 120 further includes a PLC waveguide array 124 with waveguides 124A-124F. Light beams directed to splitter array 120 by free-space optics 130 are coupled to output ports 111-116 by waveguides 124A-124F. In such embodiments, PLC waveguide array 124 may be packaged together with PLC splitters 121-123 in a single compact and precisely aligned assembly. In some embodiments, each of waveguides 124A-124F comprises a substantially straight waveguide that may include a variable optical attenuator 127 to reduce the power level of an optical signal passing therethrough. Thus, in such embodiments, the attenuation of each of output signals 111A-116A can be performed independently.

In some embodiments, splitter array 120 further includes an array 150 of micro lenses 151 for collimating light that exits waveguides 121A-121F, 122A-122F, and 123A-123F. Thus, diverging light beams exiting the waveguides of splitter array 120 are collimated, and collimated light beams from free-space optics 130 are focused on and coupled into waveguides 124A-124F in PLC waveguide array 124. Array 150 may be configured as a single two-dimensional array of collimating micro lenses or as multiple one-dimensional arrays 151-154 of collimating micro lenses. In the latter case, one-dimensional arrays 151-154 are positioned at an end face of PLC splitters 121-124, respectively. One-dimensional arrays 151-153 each include N collimating micro lenses that each correspond to a one of waveguides 121A-121F, 122A-122F, and 123A-123F, while one-dimensional array 154 includes N collimating micro lenses that each correspond to one of waveguides 124A-124F in PLC waveguide array 124. Thus, in the embodiment illustrated in FIG. 1, one-dimensional array 154 includes micro lenses 154A-154F, which are aligned with waveguides 124A-124, respectively.

Referring to FIG. 1, free-space optics 130 are positioned between splitter array 120 and linear array 140 as shown, and are configured to direct light from the M×N waveguides of splitter array 120 onto linear array 140 and to direct selected light beams from linear array 140 to the N×1 waveguides 124A-124F of PLC waveguide array 124. Free-space optics 130 include first 4 F cylindrical lens 131, focusing cylindrical lens 132, and second 4 F cylindrical lens 133. Together, first 4 F cylindrical lens 131 and second 4 F cylindrical lens 133 form a 4 F imaging system that receives collimated light beams from splitter array 120 and images the received light at an image plane 135. Focusing cylindrical lens 132, in conjunction with the reflective switching devices 141A-141F, receives collimated light beams from splitter array 120 and focuses the received light beams at image plane 135, and receives diverging light beams from reflective switching devices 141A-141F and collimates and directs said light beams to PLC waveguide array 124.

Figures 3A, 3B:
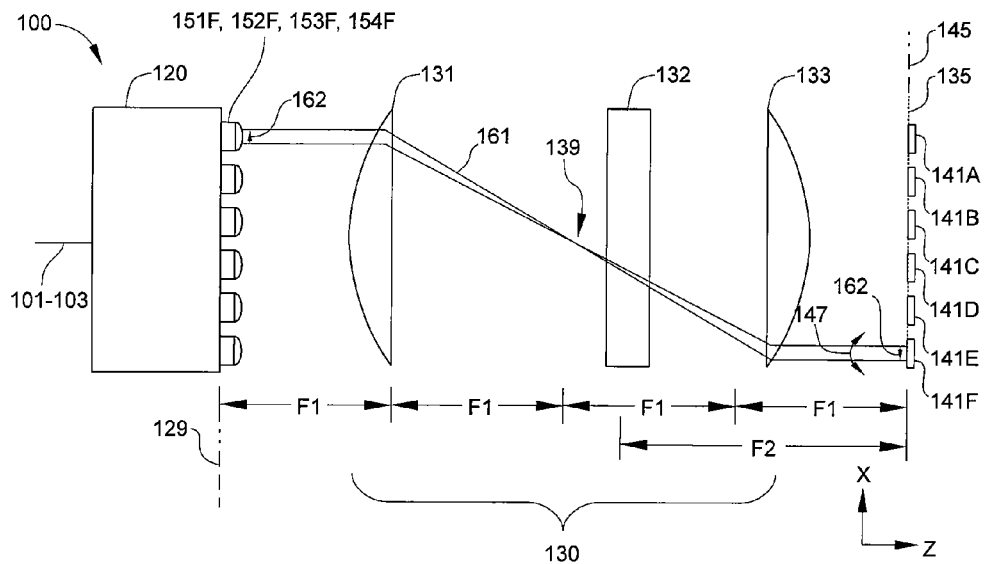
FIG. 3A illustrates a light beam exiting a collimating micro lens of a splitter array and being imaged to a reflective switching device in the multicast optical switch of FIG. 1.
FIG. 3B illustrates a light beam exiting a collimating micro lens of a splitter array and being focused on a reflective switching device by a focusing cylindrical lens in the multicast optical switch of FIG. 1.

As part of a 4 F imaging system, first 4 F cylindrical lens 131 is positioned at a ocal length F1 from the end face of splitter array 120, and is located at twice the focal length F1 from second 4 F cylindrical lens 133, so that a focal point 139 (indicated in FIG. 3A) is located between and equidistant from first 4 F cylindrical lens 131 and second 4 F cylindrical lens 133. In addition, second 4 F cylindrical lens 133 is positioned at one focal length F1 from image plane 135. Because the axis of first 4 F cylindrical lens 131 and the axis of second 4 F cylindrical lens 133 are each oriented parallel with the y-axis, the 4 F imaging system images light at image plane 135 only in the x-z plane, as illustrated in FIG. 3A. FIG. 3A illustrates a light beam 161 exiting a collimating micro lens 151F of splitter array 120 and being imaged to a reflective switching device 141F in the multicast optical switch of FIG. 1. Light beam 161 is imaged on reflective switching device 141F since reflective switching device 141F is disposed in image plane 135. Because first 4 F cylindrical lens 131 is positioned at one focal length F1 from splitter array 120, an image 162 at reflective switching device 141F in the x-z plane is formed as shown at reflective switching device 141F. It is noted that because the axis of focusing cylindrical lens 132 is oriented parallel with the x-axis, focusing cylindrical lens 132 does not significantly alter the path of light beam 161 in the x-z plane illustrated in FIG. 3A.

In the embodiment illustrated in FIGS. 1, 3A, and 3B, the 4 F imaging system formed by first 4 F cylindrical lens 131 and second 4 F cylindrical lens 133 assumes that first 4 F cylindrical lens 131 and second 4 F cylindrical lens 133 have the same the focal length F1. In other embodiments, the focal length of first 4 F cylindrical lens 131 and second 4 F cylindrical lens 133 are not equal, and first 4 F cylindrical lens 131, second 4 F cylindrical lens 133, and focal point 139 are repositioned accordingly.

As part of a focusing system, focusing cylindrical lens 132 is positioned at a focal length F2 from image plane 135. Because the axis of focusing cylindrical lens 132 is each oriented parallel with the x-axis, the focusing system focuses light at image plane 135 only in the y-z plane, as illustrated in FIG. 3B. FIG. 3B illustrates light beam 161 exiting collimating micro lens 151F of splitter array 120 and being focused on reflective switching device 141F by focusing cylindrical lens 132 in the multicast optical switch of FIG. 1. Light beam 161 is focused on reflective switching device 141F since reflective switching device 141F is disposed in image plane 135. As shown in FIG. 3B, light beam 161 reflects off reflective switching device 141F, diverges until passing through and being collimated by focusing cylindrical lens 132, and enters waveguide 124F via a collimating micro lens 154F of one-dimensional array 154. It is noted that because the respective axes of first 4 F cylindrical lens 131 and second 4 F cylindrical lens 133 are oriented parallel with the y-axis, first 4 F cylindrical lens 131 and second 4 F cylindrical lens 133 do not significantly alter the path of light beam 161 in the y-z plane illustrated in FIG. 3B.

Referring to FIG. 1, linear array 140 includes N reflective switching devices 141A-141F, which are positioned on a primary axis 145 and in image plane 135. By rotating about primary axis 145, each of reflective switching devices 141A-141F is configured to direct a copy of one of input optical signals 101A-103A to a particular output port of multicast optical switch 100 associated with that reflective switching device. For example, reflective switching device 141A is configured to direct one of three optical signals to output port 116: a copy of input optical signal 101A from waveguide 121A, a copy of input optical signal 102A from waveguide 122A, or a copy of input optical signal 103A from waveguide 123A. In addition, reflective switching device 141A may be configured to direct none of these optical signals to output port 116, so that no optical signal propagates along output port 116A. Thus, reflective switching device 141A selects which of input optical signals 101A-103A is directed to output port 116 by rotating about primary axis 145.

Reflective switching devices 141A-141F may be any technically feasible reflective elements that can each be rotated independently in a controlled manner about primary axis 145. In some embodiments, reflective switching devices 141A-141F are made up of a 1×N array of microelectromechanical systems (MEMS) mirrors. In one such embodiment, each of the MEMS mirrors of the 1×N array can be controlled to rotate about both primary axis 145 and a respective secondary axis 146A-F (illustrated in FIG. 1 and FIG. 3B). As shown in FIG. 1, each of secondary axes 146A-F corresponds to one of reflective switching devices 141A-F. As described below, rotation about a secondary axis 146A-F can provide attenuation and/or "hitless" switching when reflective switching devices 141A-141F are rotated to direct a different input optical signal to an output port.

In operation, input optical signals 101A-103A are received by multicast optical switch 100 at input ports 101-103, respectively. Each of input optical signals 101A-103A are split into N copies by splitter array 120. The N copies of input optical signals 101A-103A are emitted by splitter array 120, collimated by array 150 of micro lenses 151, and are focused in the y-z plane onto linear array 140 of reflective switching devices 141A-141F by focusing cylindrical lens 132. Simultaneously, the N copies of input optical signals 101A-103A emitted by splitter array 120 are imaged onto reflective switching devices 141A-141F by first 4 F cylindrical lens 131 and second 4 F cylindrical lens 133. Rotation of each of reflective switching devices 141A-141F about primary axis 145 determines which of input optical signals 101A-103A is directed to output ports 111-116. Thus, a copy of each of input optical signals 101A-103A is directed to each of reflective switching devices 141A-141F in linear array 140, but only one of these optical signals is then directed to a waveguide in PLC waveguide array 124 that is aligned with the reflective switching device.

While one of the optical signals incident on a particular reflective switching device in array 140 is directed as desired to a waveguide in PLC waveguide array 124, the remaining optical signals incident on the reflective switching device are also reflected toward splitter array 120. In some configurations of splitter array 120, for example when PLC splitters 121-123 are closely spaced, such reflected optical signals can be undesirably coupled to one or more of the waveguides in PLC splitters 121-123 and/or in PLC waveguide array 124 when a reflective switching device is repositioned. For example, as illustrated in FIG. 3B, reflective switching device 141F is positioned to direct light beam 161 to collimating micro lens 154F after light beam 161 exits collimating micro lens 151F. To direct a light beam exiting collimating micro lenses 152F or 153F, reflective switching device 141F is repositioned by rotating about primary axis 145 (shown in FIG. 3A) to a suitable orientation. This rotation is indicated by arrow 149 in FIG. 3B. One of skill in the art will appreciate that during the repositioning of reflective switching device 141F, light beams focused thereon from collimating micro lenses 151F, 152F, or 153F may be optically coupled to collimating micro lenses 151F, 152F, 153F, or 154F. Because coupling of any unwanted optical signals into the waveguides of PLC splitters 121-123 and/or of PLC waveguide array 124 is highly undesirable, some embodiments of the invention provide "hitless" switching, in which such coupling of unwanted optical signals is minimized or eliminated when a reflective switching device in array 140 is repositioned.

In some embodiments, hitless switching is accomplished using two-axis reflective switching devices in array 140. Referring to FIG. 3A, when a particular reflective switching device in array 140 is repositioned by rotating about primary axis 145 to direct a different input signal to a waveguide of PLC waveguide array 124, rotation of the reflective switching device about the corresponding secondary axis 146A-F (illustrated in FIG. 3B) prevents unwanted optical signals from being coupled into any of the waveguides of PLC splitters 121-123 and/or of PLC waveguide array 124. Rotation of the reflective switching device about the corresponding secondary axis 146A-F prevents such unwanted optical coupling by altering an image produced on the reflective switching device to optically decouple light from any of the waveguides of PLC splitters 121-123 and/or of PLC waveguide array 124. Specifically, an image, e.g., image 162 in FIG. 3A, is produced at image plane 135 in the x-z plane by the 4 F imaging system formed by first 4 F cylindrical lens 131 and second 4 F cylindrical lens 133. Tilting of the reflective switching device associated with image 162 about secondary axis 146A-F, as indicated in FIG. 3A by arrow 147, produces a tilted, or "edge-on" view of image 162 at an image plane 129 that is coincident with the end face of splitter array 120 and/or array 150. Consequently, sufficient tilting of a reflective switching device about secondary axis 146A-F causes light that is associated with image 162 and is imaged onto image plane 129 to couple very inefficiently or not at all to any waveguides or micro lenses disposed in image plane 129. In this way, rotation of a reflective switching device about secondary axis 146A-F can be used to effectively "blank" optical signals imaged on the reflective switching device, since such signals will be optically decoupled from any waveguide disposed in image plane 129. Thus, hitless switching can be performed by a reflective switching device by rotation of the reflective switching device about secondary axis 146A-F prior to repositioning about primary axis 145.

In some embodiments, rotation of each of reflective switching devices 141A-141F about secondary axis 146A-F provides attenuation at each of output ports 111-116, respectively. Specifically, rather than completely blocking optical signals directed by a particular reflective switching device in array 140, rotation of the reflective switching device about secondary axis 146A-F can be controlled to reduce the optical coupling of a light beam directed to the output port associated with the reflective switching device, thereby attenuating an optical signal as desired.

In embodiments in which rotation of reflective switching devices 141A-141F about secondary axis 146A-F provides attenuation and/or hitless switching, array 140 includes a 1×N array of two-axis reflective switching devices, such as two-axis MEMS mirrors, which are configured to be controllably rotated about primary axis 145 and secondary axis 146A-F.

It is noted that definition of "input" and "output" ports and signals used herein is consistent with a signal "DROP" application in a ROADM. It is further noted that in a signal "ADD" application, the "input" and "output" ports are reversed. For simplicity, the operation of multicast optical switch 100 is described above as only the "DROP" direction. In other embodiments, multicast optical switch 100 may also be used in the "ADD" direction by reversing the signal flow direction. For example, in some embodiments, multicast optical switch 100 can be configured so that output ports 111-116 may be used as input ports, and input ports 101-103 may be used as output ports.

Figure 4A:
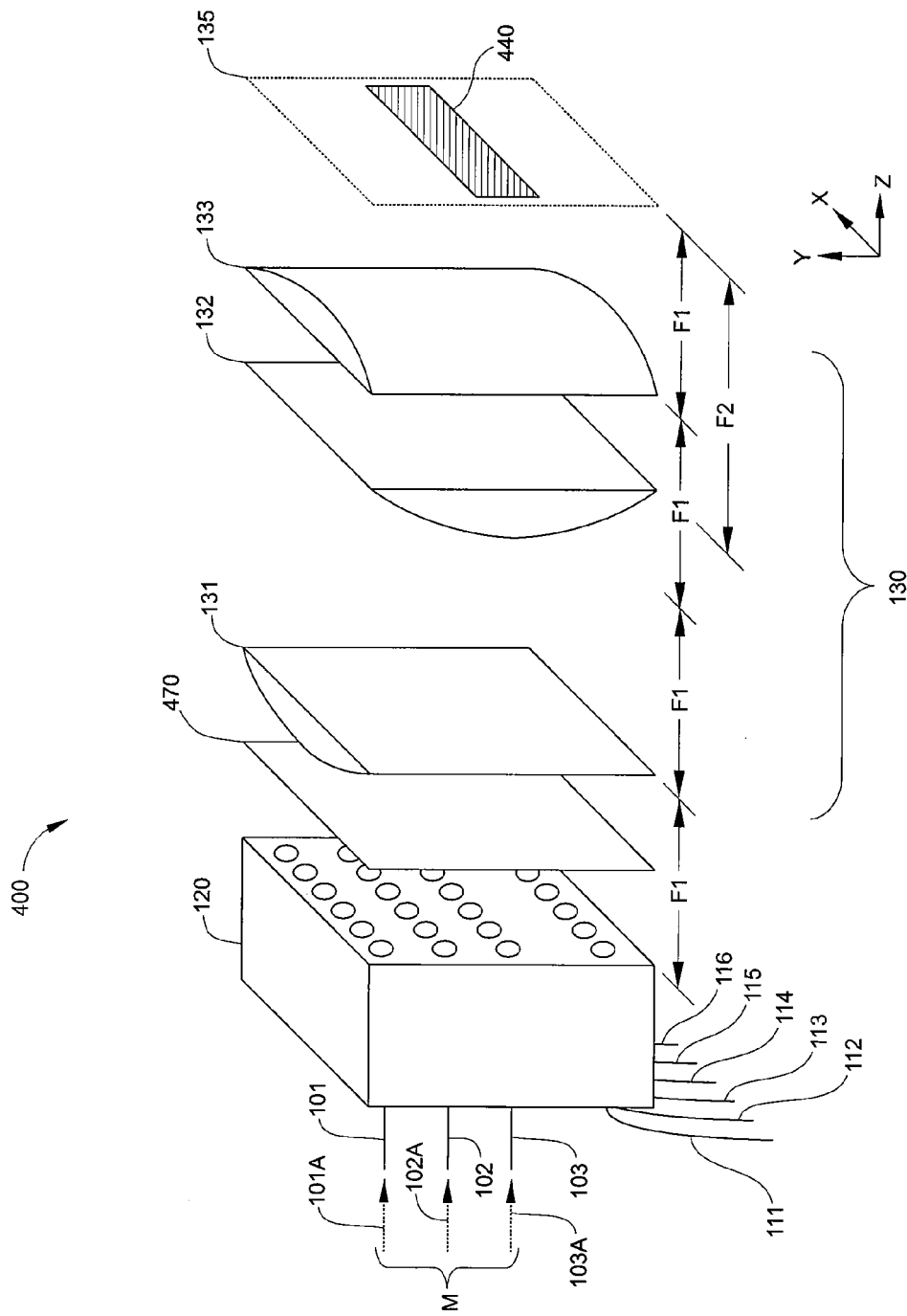
FIG. 4A is a schematic illustration of a multicast optical switch according to an embodiment of the invention.

According to some embodiments of the invention, a multicast optical switch with an M×N switching capability includes a liquid-crystal on silicon (LCOS) phased-array panel rather than an array of reflective switching devices. In addition, an array of polarization-rotating liquid-crystal elements may provide independent attenuation and/or hitless switching for each of the N outputs of the multicast optical switch. FIG. 4A is a schematic illustration of a multicast optical switch 400 according to an embodiment of the invention. Multicast optical switch 400 is substantially similar in organization and operation to multicast optical switch 100 of FIG. 1, except that multicast optical switch 400 includes LCOS panel 440 instead of array 140 of reflective switching devices and further includes a polarization diversity assembly 470. It is noted that if a polarization-independent LCOS phase modulator panel is used then the polarization diversity assembly 470 is not required.

Polarization diversity assembly 470 is a polarization management device well-known in the art and is configured to convert a light beam propagating from splitter array 120 and having arbitrary polarization to two parallel and closely spaced light beams having only a single linear polarization orientation. Thus, light passing through polarization diversity assembly 470 from splitter array 120 has a single known polarization state. In addition, polarization diversity assembly 470 is configured to convert two parallel light beams propagating from LCOS panel 440 and having a single linear polarization orientation to a single light beam having arbitrary polarization orientation. Generally, polarization diversity assembly 470 may include a birefringent walk-off plate, such as a Wollaston prism or an yttrium orthovanadate ($YVO_4$) crystal, that acts as a birefringent beam steering element and a reciprocal optical rotator, such as a half-wave plate. In one embodiment, polarization diversity assembly 470 is a birefringent beam steering unit.

LCOS panel 440 is an LCOS phased-array panel configured to provide switching and independently controlled attenuation of whatever optical signal is directed to each of output ports 111-116. As is well-known in the art, an LCOS phased-array panel can aim incident laser beams having a single known polarization state by controlling the phase of light waves reflecting from a two-dimensional surface by means of adjustable liquid crystal (LC) surface elements disposed on the surface. Groups of pixels operating together on the LCOS phased array panel act as the individual beam-steering devices. Thus, the light beam switching scheme described above for array 140 in FIG. 1 can also be implemented using LCOS panel 440. The desired steering is performed without the need for moving parts by introducing a suitable phase delay with each LCOS beam-steering device relative to the other beam-steering devices. High-resolution LCOS panels, such as panels having 1920×1028 pixels, have adequate resolution to perform phased-array steering of a large number of input optical signals, and can therefore readily be configured for use as a 1×N array of beam steering devices in lieu of array 140 in FIG. 1.

In order to enable hitless switching and/or attenuation of light beams directed to output ports 111-116, LCOS panel 440 can be configured in some embodiments to provide two-axis beam steering. Such two-axis beam steering capability in LCOS panel 440 enables hitless switching in much the same way that the two-axis beam steering of reflective switching elements 141A-141F in FIG. 1 provides hitless switching, i.e., rotation of reflective switching elements 141A-141F about primary axis 145 and secondary axis 146A-F.

Figure 4B:
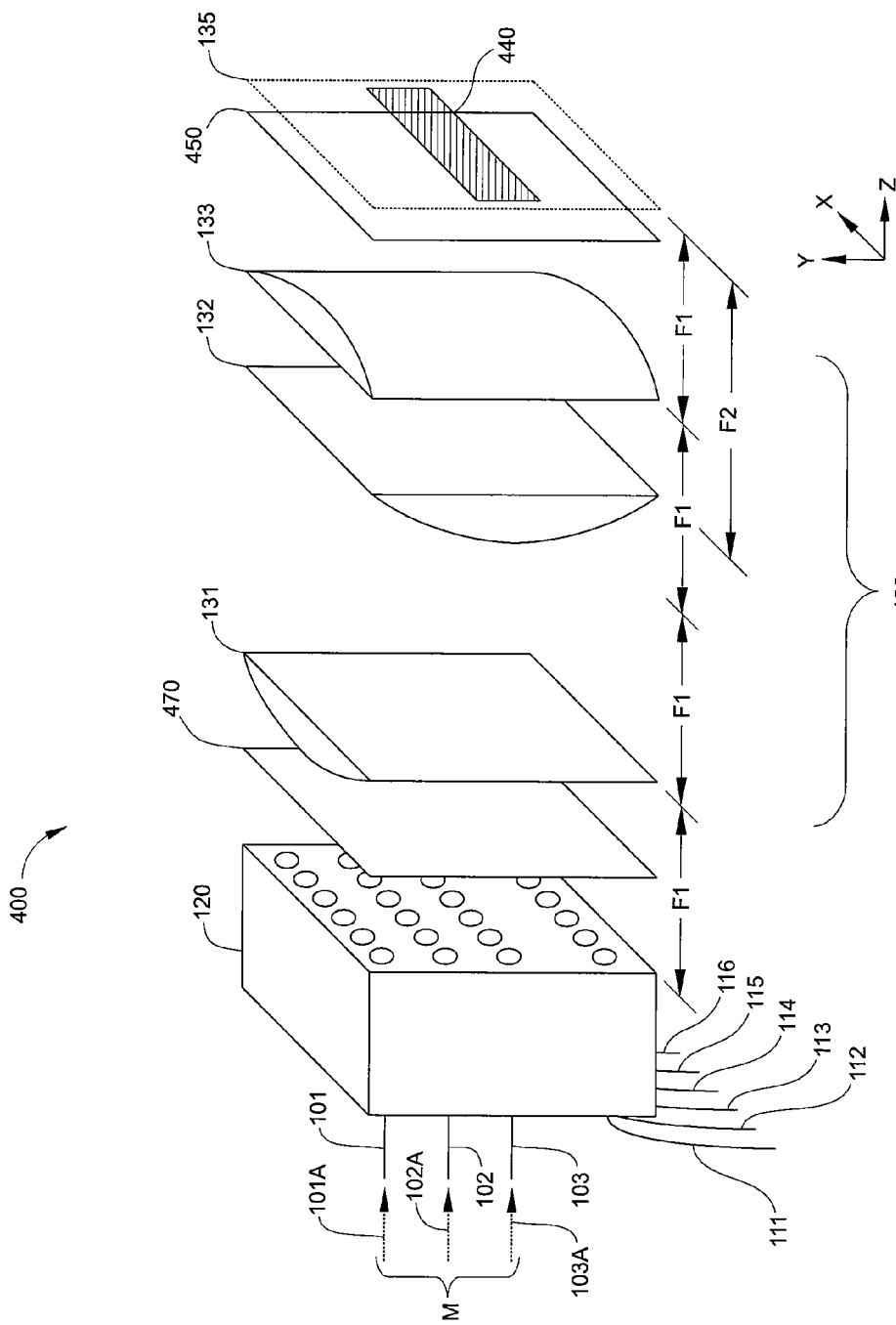
FIG. 4B is a schematic illustration of a multicast optical switch according to another embodiment of the invention.

Alternatively, in some embodiments, hitless switching and/or attenuation may be performed by multicast optical switch 400 using an array of polarization-rotating LC elements. FIG. 4B is a schematic illustration of an alternate embodiment of multicast optical switch 400 that includes such an array. As shown, in FIG. 4B multicast optical switch 400 includes an array 450 of polarization-rotating LC elements, which are disposed between cylindrical optics 130 and LCOS panel 440. Array 450 includes polarization-rotating LC elements that each contain polarizing LC material having a molecular orientation that modulates the polarization state of incident light. The amount of polarization rotation imparted by the LC element depends upon the drive voltage applied to each LC element. Generally, array 450 includes one LC element for each of output ports 111-116. Used in combination with polarization diversity assembly 470, LC array 450 acts as a voltage-controlled optical attenuator.

When attenuation of an incident light beam is desired, by applying a appropriate drive voltage to the appropriate LC element of array 450, the polarization state of said beam is modified accordingly. For example, if 10% attenuation of an incident light beam is desired, the appropriate LC element in array 450 converts 10% of the optical energy of the light beam to a polarization state that will be directed by polarization diversity assembly 470 to a light dump or other suitable beam-stopping device. The remaining 90% of the optical energy of the light beam is directed by the polarization diversity assembly 470 to the desired output port. Thus, array 450 may provide independent attenuation for each of the N output ports 111-116 of multicast optical switch 400. Array 450 may further provide multicast optical switch 400 with hitless switching capability by blanking all light directed to a particular output port when LCOS panel 440 is switching a different optical signal to the output port.

Figure 5:
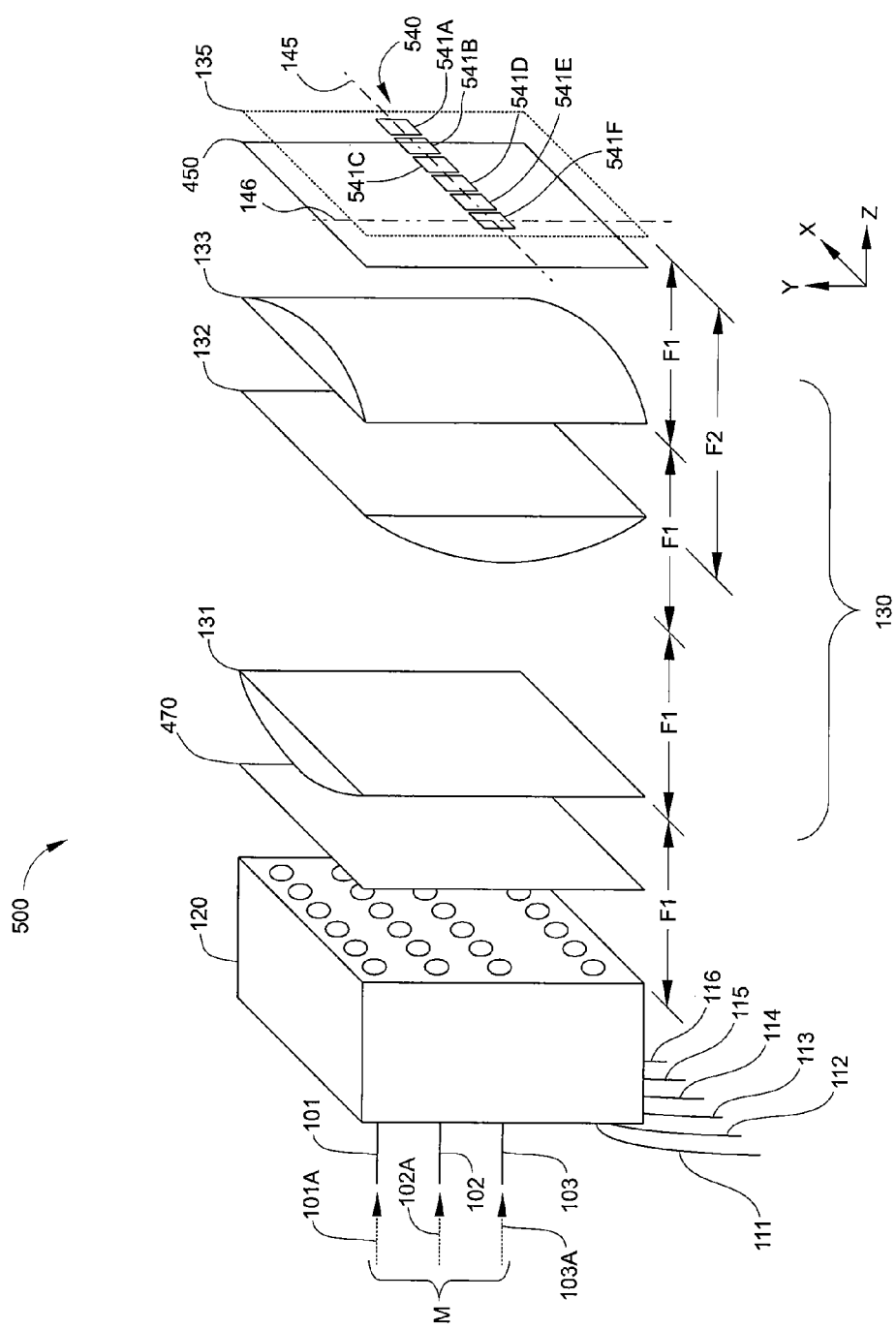
FIG. 5 is a schematic illustration of a multicast optical switch according to another embodiment of the invention.

FIG. 5 is a schematic illustration of a multicast optical switch 500 according to another embodiment of the invention. In such an embodiment, hitless switching and/or attenuation may be performed by multicast optical switch 500 by using polarization diversity assembly 470, array 450 of polarization-rotating LC elements in conjunction with a 1×N array 540 of one-axis reflective switching devices 541A-541F. In such an embodiment, reflective switching devices 541A-541F are substantially similar to reflective switching devices 141A-141F in FIG. 1, except that reflective switching devices 541A-541F are configured to be controllably rotated about primary axis 145 and not about secondary axes 146A-F. Attenuation and/or hitless switching is provided by polarization diversity assembly 470 and array 450 of polarization-rotating LC elements, as described above in conjunction with FIG. 4B. Because attenuation and/or hitless switching is provided in this way, reflective switching devices 541A-541F can be single-axis reflective switching devices, obviating the need for two-axis reflective switching devices.

Figure 6:
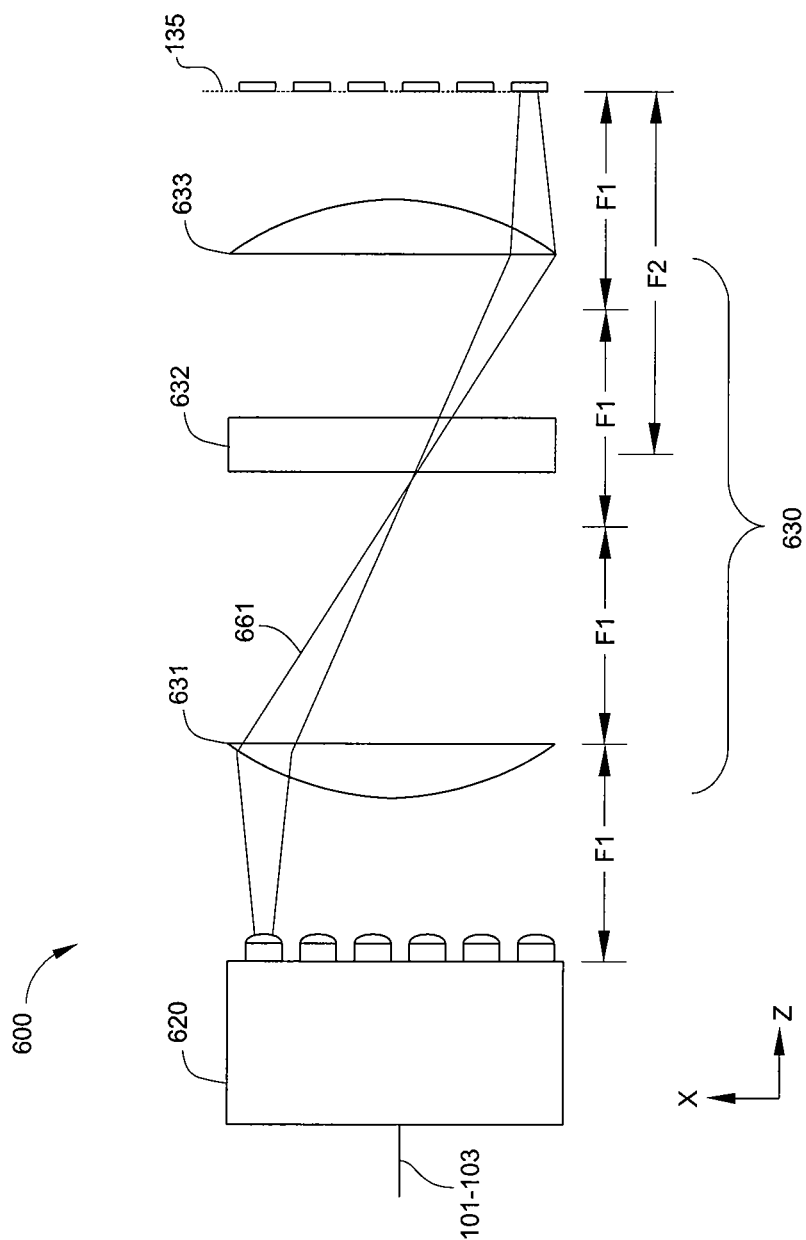
FIG. 6 is a schematic illustration of a multicast optical switch according to another embodiment of the invention.

In some embodiments, splitter array 120 is configured without array 150 of micro lenses 151 for collimating light that exits the plurality of waveguides in splitter array 120, i.e., waveguides 121A-121F, 122A-122F, and 123A-123F. Embodiments of the invention in which the splitter array of a multicast optical switch does not include an array of micro lenses can be significantly cheaper and less complex to assembly. One such embodiment is illustrated in FIG. 6. FIG. 6 illustrates a schematic view of a multicast optical switch 600 in the x-z plane according to another embodiment of the invention. Multicast optical switch 600 includes a splitter array 620 that is configured without a micro lens array for collimating light beams exiting splitter array 620. As shown, a light beam 661 exiting splitter array 620 diverges at a known angle in the x-z plane, until passing through a first 4 F lens 631 of free-space optics 630. Free-space optics 630 further include a second 4 F lens 633 and a 2 F lens 632, and are configured to image received light at image plane 135 in the x-z plane and focus received light at image plane 135 in the y-z plane. Generally, free-space optics 630 operates in the same fashion as free-space optics 130 described above in conjunction with FIGS. 3A and 3B. However, due to the divergence of light beam 661, first 4 F lens 631, second 4 F lens 633, and focusing lens 632 are generally configured with wider aperture (i.e., larger size) and/or shorter working distance (i.e., higher curvature) than the corresponding elements of free-space optics 130.

Figure 7:
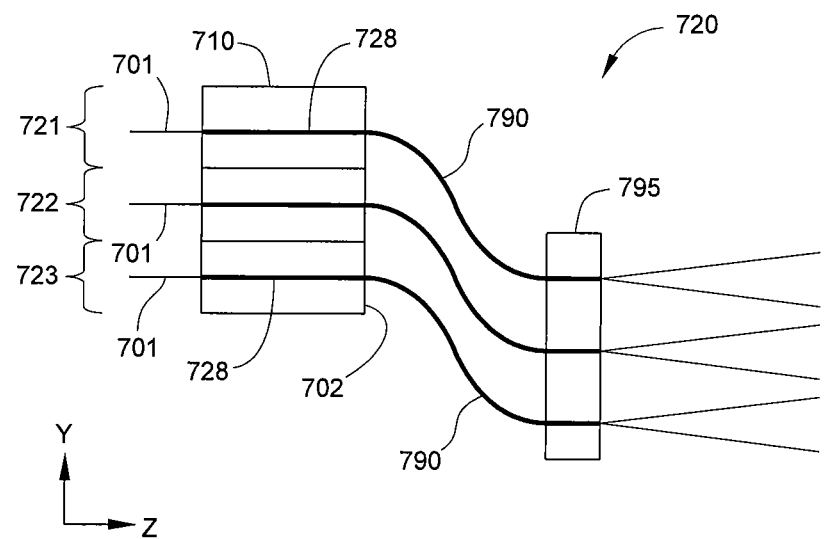
FIG. 7 is a schematic illustration of a splitter array according to an embodiment of the invention.

In some embodiments, waveguides in a splitter array in a multicast switch do not emit light beams directly into free space. Instead, the waveguides of the splitter array are optically coupled to a fiber array that then emits light beams into free space. FIG. 7 illustrates one such embodiment. FIG. 7 is a schematic illustration of a splitter array 720 according to an embodiment of the invention. Splitter array 720 is viewed in the y-z plane in FIG. 7. As shown, fiber pigtails 790 are coupled to an end face 702 of a PLC assembly 710 on one end and tied together in a fiber array 795 on the other end. PLC assembly 710 includes multiple PLC splitters 721-723, each with a single input 701 and N waveguides 728. Because splitter array 720 is viewed in the y-z plane in FIG. 7, only a single waveguide 728 is visible for each of PLC splitters 721-723. Fiber array 795 is not rigidly coupled to end face 702, and therefore can be positioned and oriented as desired, thereby making splitter array 720 more amendable for configuration in a compact housing with other elements of a multicast optical switch.

Figure 8:
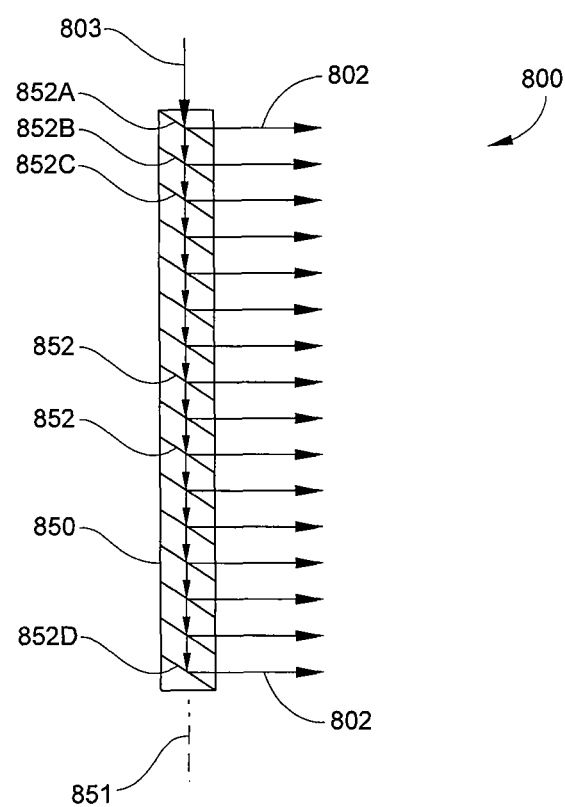
FIG. 8 is a schematic illustration of a multi-reflection beam splitter according to an embodiment of the invention.

In some embodiments, a splitter array in a multicast optical switch is configured as an array of multi-reflection beam splitters rather than multiple PLC splitters formed into a single assembly. One such embodiment is illustrated in FIG. 8, which is a schematic illustration of a multi-reflection beam splitter 800 according to an embodiment of the invention. Multi-reflection beam splitter 800 may be used in a multicast switch, such as multicast optical switch 100 in FIG. 1, and employs multiple reflections in a transparent slab 850 to produce N copies 802 of an input beam 803.

Transparent slab 850 is aligned substantially parallel to and in the path of input beam 803 and includes N partially transmissive mirrors 852 formed in a linear array in transparent slab 850. Each of the N partially transmissive mirrors 852 has a different reflectivity. Thus, the portion of input beam 803 that is not reflected by previously encountered partially transmissive mirrors 852 continues to propagate toward the remaining partially transmissive mirrors 852 in transparent slab 850. Each of partially transmissive mirrors 852 is configured with a different reflectivity, and is arranged in transparent slab 850 in ascending order of reflectivity. The difference in reflectivity between each of partially transmissive mirrors 852 is selected so that each of copies 802 of input beam 803 is substantially equal in optical power. For example, in an embodiment in which N=16, the reflectivity of each partially transmissive mirror 852 increases over the adjacent and less reflective partially transmissive mirror 852 by one sixteenth, or 6.25%. Thus, mirror 852A has a reflectivity of 6.25%, mirror 852B has a reflectivity of 12.5%, mirror 852C has a reflectivity of 18.75%, and so on, so that the final partially transmissive mirror 852 in transparent slab 850, i.e., mirror 852D, has a reflectivity of 100%. The embodiment illustrated in FIG. 8 includes partially transmissive mirrors 852 disposed at an angle of 45° from a primary axis 851 of multi-reflection beam splitter 800, which ensures that copies 802 propagate from transparent slab 850 in a substantially parallel fashion. However, the partially transmissive mirrors may be disposed at other angles from primary axis 851 without departing from the scope of the invention.

Transparent slab 850 is illustrated splitting a single input beam 803 into N copies 802. However, one of skill in the art will appreciate that transparent slab and partially transmissive mirrors 852 can be extended out of the plane of the page in FIG. 8 and used to split multiple input beams 803 into N copies. In this way, a single optical element, i.e., transparent slab 850, can be used as a splitter array in an M×N multicast switch rather than an assembly of M PLC splitters. Furthermore, in some embodiments, input beam 803 is a collimated light beam, consequently, N copies 802 of input beam 803 can be generated with multi-reflection beam splitter 800 without the use of N collimating micro lenses.

Figure 9:
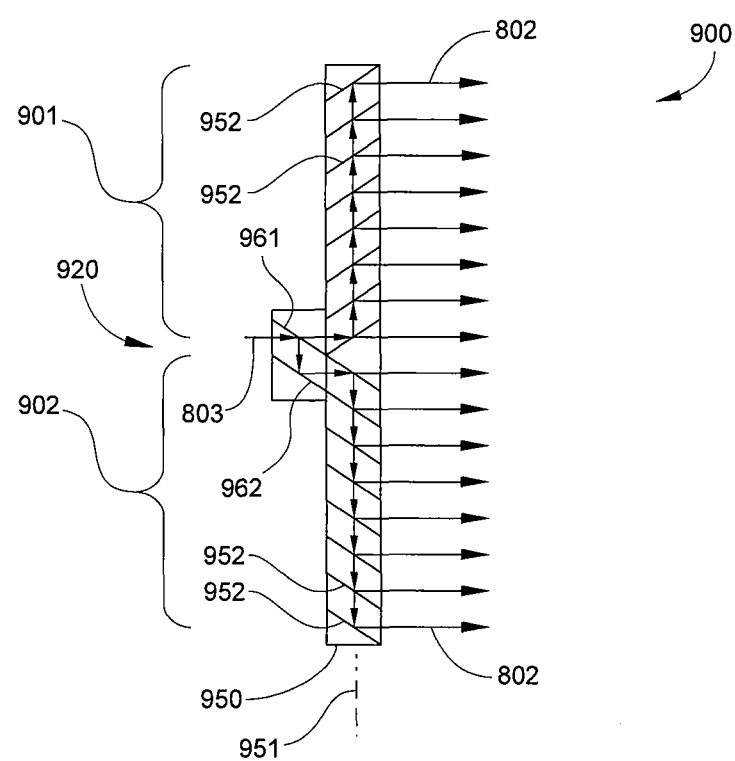
FIG. 9 is a schematic illustration of a multi-reflection beam splitter according to another embodiment of the invention.

In one embodiment, the difference in path length between each of the N copies 802 of input beam 803 can be reduced using an alternative configuration of the transparent slab. FIG. 9 is a schematic illustration of a multi-reflection beam splitter 900 according to another embodiment of the invention. Multi-reflection beam splitter 900 is configured to have a reduced path length difference between output beams thereof. As shown, input beam 803 is coupled to a transparent slab 950 of multi-reflection beam splitter 900 at a center region 920 and is substantially normal to a primary axis 951 of multi-reflection beam splitter 900. In addition, transparent slab 950 includes a first linear array 901 of partially transmissive mirrors 952 and a second linear array 902 of partially transmissive mirrors 952. Multi-reflection beam splitter 900 further includes a partially transmissive mirror 961 and a fully reflective mirror 962 disposed in center region 920 and configured to direct a portion of input beam 803 to first linear array 901 and a portion of input beam 803 to second linear array 902. Thus, input beam 803 is coupled to transparent slab 950 at one point, but propagates in two directions so that the difference in path length between each of copies 802 is significantly reduced. As with the embodiment illustrated in FIG. 8, multi-reflection beam splitter 900 can be readily adapted to split multiple input beams into N copies with no additional optical elements.

Figure 10:
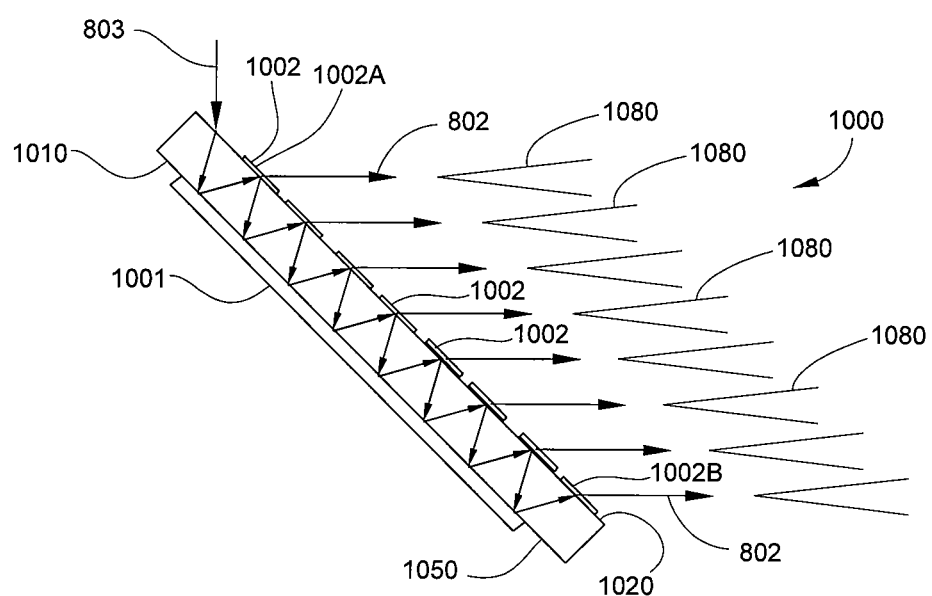
FIG. 10 is a schematic illustration of a multi-reflection beam splitter according to another embodiment of the invention.

FIG. 10 is a schematic illustration of a multi-reflection beam splitter 1000 according to another embodiment of the invention. Multi-reflection beam splitter 1000 includes a transparent slab 1050 with a rear mirror 1001 on a first surface 1010 and an array of front mirrors 1002 formed on a second surface 1020. Rear mirror 1001 comprises a fully reflective mirror that directs a remaining portion of input beam 803 back into transparent slab 1050 and toward front mirrors 1002. Rear mirror 1001 enables input beam 803 to continue propagating through transparent slab 1050 as shown. Front mirrors 1002 are each partially transmissive mirrors, and, similar to partially transmissive mirrors 852 in FIG. 8, are each configured with a different reflectivity and arranged in order of reflectivity. Front mirrors 1002 differ from transmissive mirrors 852 in FIG. 8 in that front mirrors 1002 are arranged in order of descending reflectivity. Thus front mirror 1002A has the highest reflectivity of front mirrors 1002 and front mirror 1002B has the lowest reflectivity of front mirrors 1002. The difference in reflectivity between each of front mirrors 1002 is selected so that each of the N copies 802 of input beam 803 is substantially equal in optical power. As with the embodiment illustrated in FIG. 8, multi-reflection beam splitter 1000 can be readily adapted to split multiple input beams into N copies with no additional optical elements.

Figure 11:
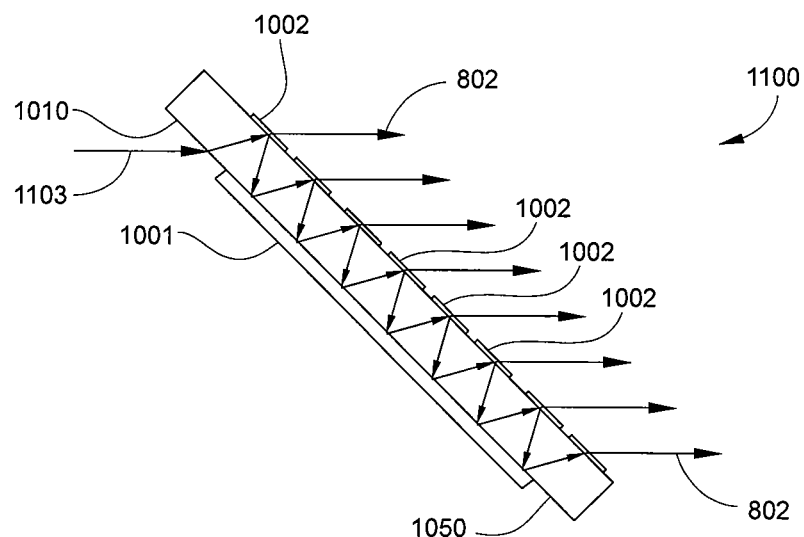
FIG. 11 is a schematic illustration of a multi-reflection beam splitter, according to yet another embodiment of the invention.

FIG. 11 is a schematic illustration of a multi-reflection beam splitter 1100 according to yet another embodiment of the invention. Multi-reflection beam splitter 1100 is substantially similar to multi-reflection beam splitter 1000 in FIG. 10, except that multi-reflection beam splitter 1100 is configured for rear input of an input beam 1103, rather than front input. Specifically, multi-reflection beam splitter 1100 is oriented with input beam 1103 incident on first surface 1010 of transparent slab 1050 at an appropriate angle, and front mirrors 1002 are positioned so that multi-reflection beam splitter 1100 splits input beam 1103 into N copies 802 that propagate along optical paths as desired. In the embodiment illustrated in FIG. 11, input beam 1103 is split into N parallel copies 802.

Figure 12:
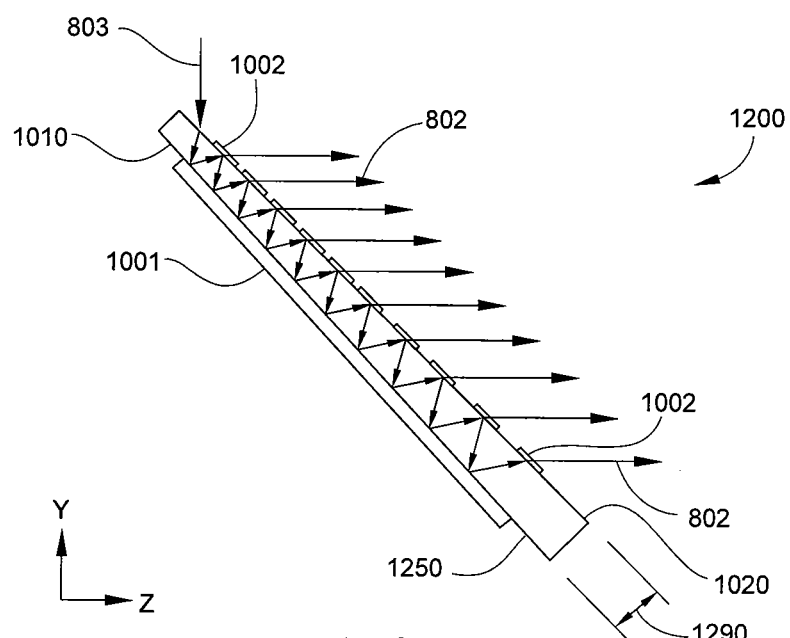
FIG. 12 is a schematic illustration of a multi-reflection beam splitter, according to yet another embodiment of the invention.

FIG. 12 is a schematic illustration of a multi-reflection beam splitter 1200 according to yet another embodiment of the invention. Multi-reflection beam splitter 1200 is substantially similar to multi-reflection beam splitter 1000 in FIG. 10, except that multi-reflection beam splitter 1200 is configured with a transparent slab 1250 that is configured to produce N copies 802 that have "chirped" spacings, i.e., copies 802 are not uniformly spaced from each other. Specifically, transparent slab 1250 has a non-uniform thickness 1290 between first surface 1010 and second surface 1020 that increases along the length of transparent slab 1250. Such non-uniform beam spacing can be advantageous, since some mirror arrays that may be used as mirror array 140 in FIG. 1 have non-uniform spacing. One of skill in the art will appreciate that the embodiment of multi-reflection beam splitter illustrated in FIG. 12 allows beam spacing between the N copies 802 to be arbitrarily set to match an arbitrary non-uniform mirror spacing.

One potential drawback of the multi reflection beam splitter illustrated in FIG. 10 is that the beam waist 1080 of each of the copies 802 will not be at the same position along the z-axis. Because the distances and materials traversed by each copy 802 is not identical, copies 802 are not identical, and beam waist 1080 (shown in FIG. 10) of each copy 802 will not be at the same position along the z-axis. This will result in non-uniform optical performance through the rest of cylindrical optics 130 and mirror array 140. In order to compensate for this variation and to minimize the variation in the position of beam waist 1080 for each of copies 802, in some embodiments, optical slabs of varying length can be inserted between multi-reflection beam splitter 1200 and cylindrical optics 130. One such embodiment is illustrated in FIG. 13.

Figure 13:
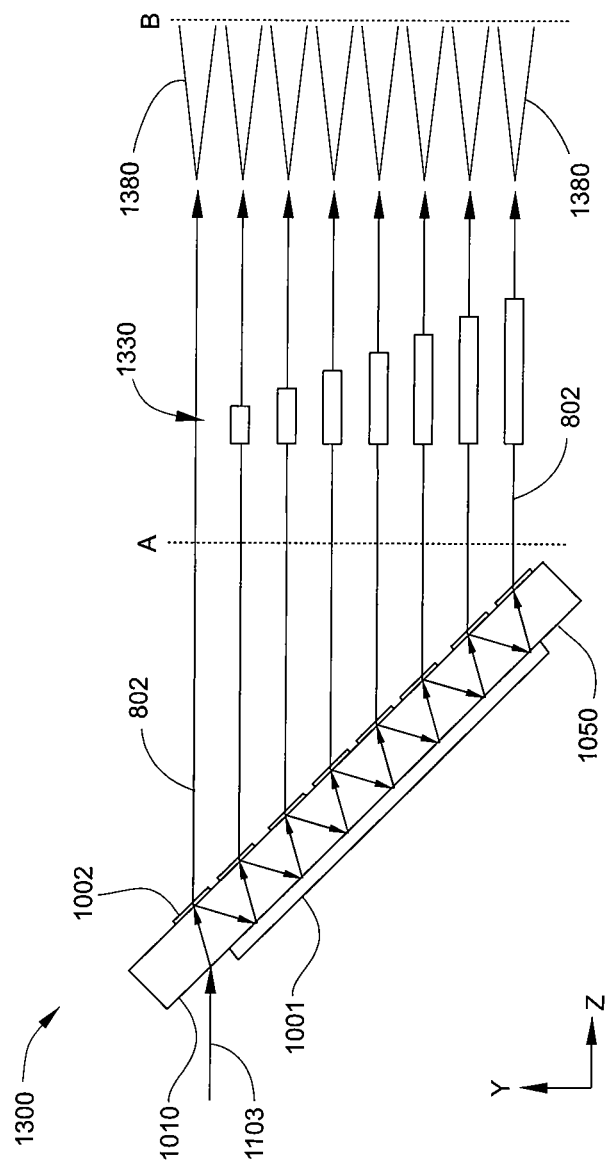
FIG. 13 is a schematic illustration of a multi-reflection beam splitter configured with compensating transparent blocks, according to another embodiment of the invention.

FIG. 13 is a schematic illustration of a multi-reflection beam splitter 1300 configured with compensating transparent blocks, according to an embodiment of the invention. Multi-reflection beam splitter 1300 is substantially similar to multi-reflection beam splitter 1000, except that multi-reflection beam splitter 1300 further comprises transparent blocks 1330. Transparent blocks 1330 are disposed between array 150 of micro lenses 151 (schematically represented by line A) and cylindrical optics 130 (schematically represented by line B). As shown, each of transparent blocks 1330 is disposed in the optical path of one of copies 802 of input beam 803, and has a different length. The length and position of each of transparent blocks 1330 is selected to align the beam waists 1380 of each of copies 802 in the z-axis and with respect to cylindrical optics 130.

One of skill in the art will appreciate that embodiments of the invention described herein, such as multicast optical switches 100, 400, and 500, can be used in a variety of optical systems, including wavelength division multiplexing (WDM) systems, in which information is carried by multiple channels, each channel having a unique wavelength. For example, each of the M input optical signals 101A-103A in FIG. 1 may be a single wavelength channel from a WDM system.

In sum, embodiments of the invention set forth a multicast optical switch that includes a free-space optical assembly of discrete splitters and a linear array of reflective switching devices, such as MEMS mirrors, to provide low-loss, high-performance multicast switching in a compact configuration. The multicast optical switch provides M×N multicast switching in a compact, low loss configuration that advantageously avoids unwieldy numbers of fiber pigtail connections common in prior art M×N multicast switches. A further advantage of the invention is that independent attenuation of output signals and/or hitless switching can be readily incorporated into the M×N multicast switch in various ways.

While the foregoing is directed to embodiments of the present invention, other and further embodiments of the invention may be devised without departing from the basic scope thereof, and the scope thereof is determined by the claims that follow.

We claim:

1. An M×N multicast switch, comprising:
   M input ports, where M is greater than 1;
   N output ports, where N is greater than 1;
   M splitters, each configured to produce N split optical signals from an input optical signal received through one of the M input ports, and each of the splitters comprising a linear array of partially-transmissive mirrors and each partially-transmissive mirror in the array has a different reflectivity; and a 1×N array of mirrors each controllable to direct one of N split optical signals to one of the N output ports.

2. The multicast switch of claim 1, wherein the M splitters are configured as a single assembly.

3. The multicast switch of claim 1, further comprising a planar lightwave circuit configured to receive the N optical signals directed by the mirrors and guide the N optical signals to the N output ports using N waveguides.

4. The multicast switch of claim 3, wherein each of the N waveguides comprises a variable optical attenuator.

5. The multicast switch of claim 1, wherein each mirror in the 1×N array of mirrors is rotatable about a first axis to direct an optical signal received thereat to one of the N output ports.

6. The multicast switch of claim 5, wherein each mirror in the 1×N array of mirrors is further rotatable about a second axis to enable hitless switching.

7. The multicast switch of claim 1, wherein the N split optical signals produced by one of the M splitters are of approximately equal intensity.

8. The multicast switch of claim 1, further comprising cylindrical optics disposed between the M splitters and the 1×N array of mirrors and configured to focus light from the M splitters on each of the mirrors in a first plane and to produce an image with light from the M splitters on each of the mirrors in a second plane, the second plane being orthogonal to the first plane.

9. An M×N multicast switch, comprising:
M input ports, where M is greater than 1;
N output ports, where N is greater than 1;
M splitters, each configured to produce N split optical signals from an input optical signal received through one of the M input ports, and each of the splitters comprises a linear array of mirrors and each mirror in the array has a different reflectivity; and
M mirrors, each mirror associated with one of the input ports and controllable to direct an input optical signal from an associated input port to anyone of the N output ports,
wherein, while one of the mirrors is controlled to switch the input optical signal directed at a first output port to be directed at a second output port different from the first output port, the input optical signal is optically decoupled from all of the output ports during the switching between the first and second output port.

10. The multicast switch of claim 9, wherein, after said one of the mirrors has been controlled to switch the input optical signal directed at the first output port to be directed at the second output port, the input optical signal is optically coupled to the second output port.

11. The multicast switch of claim 10, wherein the controlled mirror is rotatable about a first axis to switch the input optical signal directed at the first output port to be directed at the second output port and is rotatable about a second axis to optically decouple the input optical signal from all of the output ports.

12. The multicast switch of claim 9, further comprising cylindrical optics disposed between the N splitters and the M mirrors and configured to focus light from the N splitters on each of the M mirrors in a first plane and to produce an image with light from the N splitters on each of the M mirrors in a second plane, the second plane being orthogonal to the first plane.

13. The multicast switch of claim 9, further comprising:
a liquid crystal pixel positioned in an optical path of the input optical signal for rotating a polarization of the input optical signal to optically decouple the input optical signal from all of the output ports.

14. The multicast switch of claim 13, further comprising:
a first beam steering assembly positioned between the input ports and the liquid crystal pixel for converting the input optical signal into a pair of parallel beams having the same polarization and for directing the parallel beams from the mirrors into one of the N output ports.

15. An M×N multicast switch, comprising:
M input ports, where M is greater than 1;
N output ports, where N is greater than 1;
a liquid-crystal on silicon (LCOS) panel having 1×N beam steering elements, each beam steering element comprising multiple pixels whose phase can be controlled individually to direct an input optical signal from anyone of the M input ports to one of the N output ports associated with the beam steering element;
M splitters, each configured to produce N split optical signals from an input optical signal received through one of the M input ports; and
cylindrical optics disposed between the M splitters and the LCOS panel, the optics configured to focus light from the M splitters on each of the beam steering elements in a first plane and to produce an image with light from the M splitters on each of the beam steering elements in a second plane, the second plane being orthogonal to the first plane.

16. The multicast switch of claim 15, further comprising:
a birefringent beam steering element configured to direct light having a first polarization state from each beam steering element of the LCOS panel into the output port associated with the beam steering element of the LCOS panel; and
an array of N liquid crystal elements disposed between the LCOS panel and the birefringent beam steering element, each liquid crystal element controllable to rotate the polarization of an input optical signal directed from one of the M input ports to one of the N output ports.

17. An M×N multicast switch, comprising:
M input ports, where M is greater than 1;
N output ports, where N is greater than 1; and
N mirrors, each mirror controllable to direct an input optical signal from any one of the M input ports to one of the N output ports associated with the mirror,
wherein, while one of the mirrors is controlled to switch the input optical signal from a first input optical signal, which is received through a first of the M input ports, to a second input optical signal, which is received through a second of the M input ports, all input optical signals are first optically decoupled from an output port associated with the controlled mirror, and then the desired second input optical signal is coupled to the output port associated with the controlled mirror.

18. The multicast switch of claim 17, wherein the controlled mirror is rotatable about a first axis to switch the input optical signal from the first input optical signal to the second input optical signal and is rotatable about a second axis to optically decouple the first input optical signal from the output port associated with the controlled mirror.

19. The multicast switch of claim 17, further comprising M splitters, each configured to produce N split optical signals from an input optical signal received through one of the M input ports.

20. The multicast switch of claim 19, further comprising cylindrical optics disposed between the M splitters and the N mirrors and configured to focus light from the M splitters on each of the N mirrors in a first plane and to produce an image with light from the M splitters on each of the N mirrors in a second plane, the second plane being orthogonal to the first plane.

21. The multicast switch of claim 19, wherein each of the splitters comprises a planar lightwave circuit.

22. The multicast switch of claim 19, wherein each of the splitters comprises a linear array of mirrors and each mirror in the array has a different reflectivity.

23. The multicast switch of claim 17, further comprising a liquid crystal pixel positioned in an optical path of the first input optical signal for rotating a polarization of the first input optical signal to optically decouple the first input optical signal from the output port associated with the controlled mirror.

\* \* \* \* \*